United States Patent
Kroon

(10) Patent No.: US 11,823,323 B2
(45) Date of Patent: Nov. 21, 2023

(54) APPARATUS AND METHOD OF GENERATING AN IMAGE SIGNAL

(71) Applicant: KONINKLIJKE PHILIPS N.V., Eindhoven (NL)

(72) Inventor: Bart Kroon, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 156 days.

(21) Appl. No.: 17/435,066

(22) PCT Filed: Feb. 29, 2020

(86) PCT No.: PCT/EP2020/055377
§ 371 (c)(1),
(2) Date: Aug. 31, 2021

(87) PCT Pub. No.: WO2020/178212
PCT Pub. Date: Sep. 10, 2020

(65) Prior Publication Data
US 2022/0165020 A1 May 26, 2022

(30) Foreign Application Priority Data

Mar. 1, 2019 (EP) ..................... 19160411

(51) Int. Cl.
*G06T 15/20* (2011.01)
*G06T 17/00* (2006.01)
(52) U.S. Cl.
CPC .......... *G06T 15/205* (2013.01); *G06T 17/005* (2013.01); *G06T 2210/61* (2013.01)
(58) Field of Classification Search
CPC . G06T 15/205; G06T 17/005; G06T 2210/08; G06T 2210/61; G06T 7/10; H04N 19/597; H04N 19/88
See application file for complete search history.

(56) References Cited

U.S. PATENT DOCUMENTS

| | | | | |
|---|---|---|---|---|
| 2013/0106852 A1* | 5/2013 | Woodhouse | .......... | G06T 17/005 345/423 |
| 2020/0153885 A1* | 5/2020 | Lee | .......... | G06T 15/04 |
| 2020/0413097 A1 | 12/2020 | Kroon et al. | | |

FOREIGN PATENT DOCUMENTS

WO 2017050858 A1 3/2017

OTHER PUBLICATIONS

Dore et al "RVS Based 3D of Evidence Results" technicolor.com Presented 124th MPEG Meeting Sep. 28, 2018.

(Continued)

*Primary Examiner* — Daniel F Hajnik

(57) ABSTRACT

An image source (407) provides an image divided into segments of different sizes with only a subset of these comprising image data. A metadata generator (409) generates metadata structured in accordance with a tree data structure where each node is linked to a segment of the image. Each node is a branch node linking the parent node to child nodes linked to segments that are subdivisions of the parent node, or a leaf node which has no children. A leaf node is either an unused leaf node linked to a segment for which the first image comprises no image data or a used leaf node linked to a segment for which the first image comprises image data. The metadata indicates whether each node is a branch node, a used leaf node, or an unused leaf node. An image signal generator (405) generates an image signal comprising the image data of the first image and the metadata.

17 Claims, 8 Drawing Sheets

(56) References Cited

OTHER PUBLICATIONS

"High Efficiency Video Coding Tiers and Levels" Wikipedia Downloaded Aug. 20, 2021.
Maugey Thomas et al "Reference View Selection in DIBR-Based Multiview Coding" IEEE Transactions On Image Processing, vol. 25, No. 4 Apr. 1, 2016 p. 1808-1819.
International Search Report and Written Opinion From PCT/EP2020/055377 dated Sep. 10, 2020.
Arithmetic Coding—Wikipedia Downloaded Aug. 27, 2021.
Inpainting—Wikipedia Downloaded Aug. 27, 2021.

* cited by examiner

APPARATUS AND METHOD OF GENERATING AN IMAGE SIGNAL

CROSS-REFERENCE TO PRIOR APPLICATIONS

This application is the U.S. National Phase application under 35 U.S.C. § 371 of International Application No. PCT/EP2020/055377, filed on Feb. 29, 2020, which claims the benefit of EP Patent Application No. EP 19160411.5, filed on Mar. 1, 2019. These applications are hereby incorporated by reference herein.

FIELD OF THE INVENTION

The invention relates to an apparatus and method for generating an image signal and in particular, but not exclusively, to generation and/or processing of an image signal comprising multiple images for the same scene.

BACKGROUND OF THE INVENTION

The variety and range of image and video applications have increased substantially in recent years with new services and ways of utilizing and consuming video being continuously developed and introduced.

For example, one service being increasingly popular is the provision of image sequences in such a way that the viewer is able to actively and dynamically interact with the system to change parameters of the rendering. A very appealing feature in many applications is the ability to change the effective viewing position and viewing direction of the viewer, such as for example allowing the viewer to move and "look around" in the scene being presented.

Such a feature can specifically allow a virtual reality experience to be provided to a user. This may allow the user to e.g. (relatively) freely move about in a virtual environment and dynamically change his position and where he is looking. Typically, such virtual reality applications are based on a three-dimensional model of the scene with the model being dynamically evaluated to provide the specific requested view. This approach is well known from e.g. game applications, such as in the category of first person shooters, for computers and consoles.

It is also desirable, in particular for virtual reality applications, that the image being presented is a three-dimensional image. Indeed, in order to optimize immersion of the viewer, it is typically preferred for the user to experience the presented scene as a three-dimensional scene. Indeed, a virtual reality experience should preferably allow a user to select his/her own position, camera viewpoint, and moment in time relative to a virtual world.

A large number of virtual reality applications are inherently limited in that they are based on the presence of a predetermined model of the scene, and typically on an artificial model of a virtual world, such as for example for gaming applications.

However, it is desirable to be able to provide virtual reality experiences that allow the user to experience a real world capture. Such applications include e.g. applications that allow a user to freely change position and view direction in a representation of a real world scene. However, the requirements in order to support such freedom are difficult to meet in many circumstances, such as in particular where the real world scene is also a dynamically changing, and specifically a real time scene. For example, providing sufficient data to allow a user to freely move and change view direction for a scene which corresponds to a live, real time broadcast of e.g. a sports event, is typically not practical or feasible. Accordingly, applications and experiences where the user has restricted freedom in movement and/or view directions are receiving increasing interest. For example, a sports event may be broadcast where a user may rotate his head freely within a 180° range but only move his head by a relatively small amount. Such limited movement may reduce the requirements for the data that needs to be provided substantially.

A critical issue for most applications allowing local rendering of images for different viewpoints of a scene is that of how to represent such a scene, and in particular how to effectively generate, distribute, and process data representing a real world scene such that an end user device is provided with sufficient data to locally generate view images of the real world, and often real time, scene. It is typically not feasible or practical to generate a model of a real world scene and in particular not when the service is supporting a dynamically changing scene such as a real time event.

In many systems, the scene may be represented by images that have been captured by suitable capture apparatuses, such as cameras. For example, cameras may be arranged in a given configuration, such as in a row, with each camera capturing the scene from a given capture pose. The images from different positions may provide a representation of different parts of the scene. For example, a background object may be occluded by a foreground object from some capture positions but not from other capture positions, and thus information related to the background object may be present in some capture images but not in others.

In many practical systems, captured images may be supplemented by depth information, such as a z-value or a disparity value being provided for each pixel in an associated depth map. Such an image+depth representation may be considered a 3D image. Using image+depth information provided for a range of view points may have many applications and for many scenes provide an advantageous representation of the scene allowing local generation of view images. The image+depth information may be transmitted to a rendering device that may dynamically generate view images for the current view position and view direction of a user.

However, whereas an image representation of a scene comprising a plurality of images from different capture positions may provide desirable performance and operation in many embodiments, it tends to also require high data rates for the communication of the image representation to the rendering device. Indeed, directly distributing all captured view images is often infeasible because the pixel rate, and thus the data rate, is much too high. Directly transmitting all images is also wasteful as it includes transmitting a large amount of redundant data. For example, the front of a foreground object may be visible from a plurality of capture positions, and thus visual information for the object will be included in a plurality of the capture images to be transmitted.

However, the issue of how to reduce the required data rate is a complex issue that is difficult to address. It has been proposed to identify and omit some redundant data and then generate an image signal without this redundant data. However, whereas this may reduce the data rate, it is a difficult challenge how to specifically achieve this such that image quality, data rate, complexity, resource requirements etc. are optimized as far as possible. Indeed, a problem often encountered when communicating potentially redundant data/information is not only that of how to select or reduce the data to reduce the redundancy but in particular that of how to indicate which transmitted data is relevant and which is not. For example, for transmitting image data for several images comprising at least partially redundant data, it is not only challenging to determine which data to communicate, and how to effectively communicate this, but also how to effectively indicate which data is valid/appropriate/relevant and which is not. E.g. for partial images, it is a challenge how to indicate which parts comprise valid image data and which do not.

Hence, an improved approach would be advantageous. In particular, an approach for generating and/or processing an image signal representing a scene by images from different views that allows improved operation, increased flexibility, an improved virtual reality experience, reduced data rates, increased efficiency, facilitated distribution, reduced complexity, facilitated implementation, increased image quality, and/or improved performance and/or operation would be advantageous.

SUMMARY OF THE INVENTION

Accordingly, the Invention seeks to preferably mitigate, alleviate or eliminate one or more of the above mentioned disadvantages singly or in any combination.

According to an aspect of the invention, there is provided: an apparatus for generating an image signal, the apparatus comprising: an image source (407) for providing a first image divided into a set of segments of different sizes, the first image comprising image data only in a subset of segments of the set of segments, the image data of a segment of the subset of segments being image data from a segment of a view source image of a set of view source images representing a scene from a viewpoint; a metadata generator (409) for generating metadata indicative of the image data content of the first image, the metadata being structured in accordance with a tree data structure with each node being linked to a segment of the first image; each node being a branch node or a leaf node, a branch node being a parent node linking the parent node to at least one child node, each child node of the parent node being linked to a subsegment generated by a subdivision of the segment of the parent node, a leaf node having no child nodes and being linked with a segment of the set of segments, a leaf node being either an unused leaf node linked to a segment for which the first image comprises no image data or a used leaf node linked to a segment for which the first image comprises image data, and the metadata indicating whether each node is a branch node, a used leaf node, or an unused leaf node; and an image signal generator for generating an image signal comprising the image data of the first image and the metadata.

The invention may provide an improved representation of a scene. In many embodiments, a more efficient representation of a scene can be provided, e.g. allowing a given quality to be achieved for a reduced data rate.

The approach may in many embodiments provide an improved image signal with a representation of a scene suitable for a flexible, efficient, and high performance local generation of view images for different view positions/poses. In many embodiments, it may allow an improved perceived image quality and/or a reduced data rate.

The approach may allow a particularly efficient and/or low complexity generation of an image signal in many embodiments and scenarios.

The images may be 3D images comprising depth information, such as specifically a 2D image or texture map with associated depth image/map. Selecting the set of selected images from the set of candidate images in response to the prediction qualities may include selecting images of the set of candidate images having a lowest prediction quality measure to be included in the set of selected images.

The set of segments includes segments comprising image data for different view source images. The set of segments may include at least one segment comprising image data from a first view source image and at least one segment comprising image data from a second (different) view source image of the set of view source images.

The image data of the first image is structured in accordance with the tree data structure.

The set of segments may be segments of partial images of the view source images. A partial image may comprise only a subset of the pixel values of the corresponding view source image.

In many embodiments, the image signal may comprise an indication of a view source image origin for at least one segment of the subset of segments. The indication of a view source image origin may be indicative of a view source image of the set of view source images from which image data of the at least one segment originates, and/or may be indicative of a position of image data of the at least one segment in a view source image of the set of view source images.

According to an optional feature of the invention, the metadata further comprises an indication of the view source image of the plurality of view source images for the image data for segments linked to used leaf nodes.

This may provide an efficient image signal facilitating generation of the original view source images or partial representations of these.

According to an optional feature of the invention, the metadata further comprises an indication of a position difference between a position in the first image of a first segment linked to a used leaf note and a position in the view source image of a corresponding segment of the view source image.

This may provide an efficient combination of different view source images into the first image while allowing the original view source images, or partial images thereof, to be recreated from the image signal. The indication may specifically be an indication of a translation or movement of a segment from the position in the first image to the position in the view source image.

According to an optional feature of the invention, the image signal comprises at least some of the metadata as a data stream comprising an ordered sequence of node data blocks for at least a plurality of nodes of the data tree structure, each node data block comprising data indicative of a set of properties for the node, the set of properties including an indication of whether the node is a branch node or a leaf node.

This may provide a particularly efficient communication of metadata and image data in many embodiments. The ordered sequence may in some embodiments be predetermined and known in advance by any receiver of the image signal.

According to an optional feature of the invention, the ordered sequence comprises a plurality of segment property indications, each segment property indication being indicative of a property of at least one segment property applicable to subsequent node data blocks.

This may provide a highly efficient encoding of metadata. The property may be applicable to subsequent node data blocks until a segment property indication is received indicating a different value for the property. The segment property indication may be part of a node data block or may e.g. be included as separate data between node data blocks. The property may also be applicable to a node data block in which the segment property indication is received.

In some embodiments, the segment property indication is indicative of at least one of a view source image indication and a view source image position indication for the subsequent node data blocks According to an optional feature of the invention, the image data comprises an indication of the ordered sequence.

This may provide advantageous operation and/or performance in many embodiments.

According to an optional feature of the invention, a subdivision for a segment of a branch node is selected from one of a set of allowable subdivisions, and the metadata comprises data for a branch node indicating a subdivision out of the set of allowable subdivisions used for the branch node.

This may provide a particularly efficient image signal. In some embodiments, the set of allowable subdivisions may be predetermined.

According to an optional feature of the invention, the metadata includes an indication of the set of allowable subdivisions.

This may allow efficient communication and an efficient segmentation to be used. It may in particular allow flexible adaptation of the segmentation.

According to an optional feature of the invention, the set of view source images comprises a plurality of view source images representing the scene from different viewpoints.

According to an optional feature of the invention, a root node of the data tree structure is linked with a segment corresponding to the entire first image.

According to an optional feature of the invention, the metadata includes an indication of a smallest segment size, and wherein the segments of the set of segments have sizes being multiples of the smallest segment size.

This may provide an advantageous segmentation suitable for representation by a tree data structure.

The outlines of segments may be outlines that can be created by tiling using segments having the smallest segment size. Thus, all segments may be divisible into segments that have a size corresponding to the smallest segments possible.

According to an optional feature of the invention, the apparatus further comprises: a segmenter (401) for generating a segmented partial image for each of at least some of the view source images of the set of view source images, the segmented partial image for a view source image comprising a plurality of segments having an outline selected from a set of predetermined outlines and with the segments being divided into used segments for which at least some pixels comprise image data from the view source image and unused segments for which no pixel comprises image data from the view source image; and a combiner (403) for generating the first image by generating at least some segments of the set of segments of different sizes by including used segments from the least some view source images and not including unused segments from the at least some view source images in the first image.

According to an optional feature of the invention, the segmenter (401) is arranged to generate a first segmented partial image for a first view source image by: dividing the pixels of the first view source image into a first set of pixels for which pixel data is to be included in the image data and a second set of pixels for which pixel data is not to be included in the image data; and tiling the first view source image into segments having outlines selected from the set of predetermined outlines, the tiling being such that unused segments are generated by fitting the predetermined outlines to regions of pixels belonging to the second set of pixels.

According to another aspect of the invention, there is provided an apparatus for processing an image signal, the apparatus comprising: a receiver (303) for receiving an image signal comprising: image data of a first image divided into a set of segments of different sizes, the first image comprising image data only in a subset of segments of the set of segments, the image data of a segment of the subset of segments being image data from a segment of a view source image of a set of view source images representing a scene from a viewpoint; metadata indicative of the image data of the first image, the image data being structured in accordance with a tree data structure with each node being linked to a segment of the first image; each node being a branch node or a leaf node, a branch node being a parent node linking the parent node to at least one child node, each child node of the parent node being linked to a subsegment generated by a subdivision of the segment of the parent node, a leaf node having no child nodes and being linked with a segment of the set of segments, a leaf node being either an unused leaf node linked to a segment for which the first image comprises no image data or a used leaf node linked to a segment for which the first image comprises image data, and the metadata indicating whether the node is a branch node, a used leaf node, or an unused leaf node; a renderer for rendering synthesized view images from the image signal.

In some embodiments, the renderer is arranged to extract image data for the set of view source images from the first image in response to the metadata; and to render the synthesized view images in response to the extracted image data for the set of view source images.

In some embodiments, the apparatus may comprise a view source generator for generating a partial image for a first view source image of the set of view source images by populating regions of the partial image by segments of the image data based on the metadata. The renderer may render the synthesized view images from the partial image.

According to another aspect of the invention, there is provided a method of generating an image signal, the method comprising: providing a first image divided into a set of segments of different sizes, the first image comprising image data only in a subset of segments of the set of segments, the image data of a segment of the subset of segments being image data from a segment of a view source image of a set of view source images representing a scene from a viewpoint; generating metadata indicative of the image data content of the first image, the metadata being structured in accordance with a tree data structure with each node being linked to a segment of the first image; each node being a branch node or a leaf node, a branch node being a parent node linking the parent node to at least one child node, each child node of the parent node being linked to a subsegment generated by a subdivision of the segment of the parent node, a leaf node having no child nodes and being linked with a segment of the set of segments, a leaf node being either an unused leaf node linked to a segment for which the first image comprises no image data or a used leaf node linked to a segment for which the first image comprises image data, and the metadata indicating whether each node is a branch node, a used leaf node, or an unused leaf node; and generating an image signal comprising the image data of the first image and the metadata.

According to another aspect of the invention, there is provided a method of processing an image signal, the method comprising: receiving an image signal comprising: image data of a first image divided into a set of segments of different sizes, the first image comprising image data only in a subset of segments of the set of segments, the image data of a segment of the subset of segments being image data from a view source image of a set of view source images representing a scene from a viewpoint; metadata indicative of the image data of the first image, the image data being structured in accordance with a tree data structure with each node being linked to a segment of the first image; each node being a branch node or a leaf node, a branch node being a parent node linking the parent node to at least one child node, each child node of the parent node being linked to a subsegment generated by a subdivision of the segment of the parent node, a leaf node having no child nodes and being linked with a segment of the set of segments, a leaf node being either an unused leaf node linked to a segment for which the first image comprises no image data or a used leaf node linked to a segment for which the first image comprises image data, and the metadata indicating whether the node is a branch node, a used leaf node, or an unused leaf node; and rendering synthesized view images from the image signal.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

Figure 1:
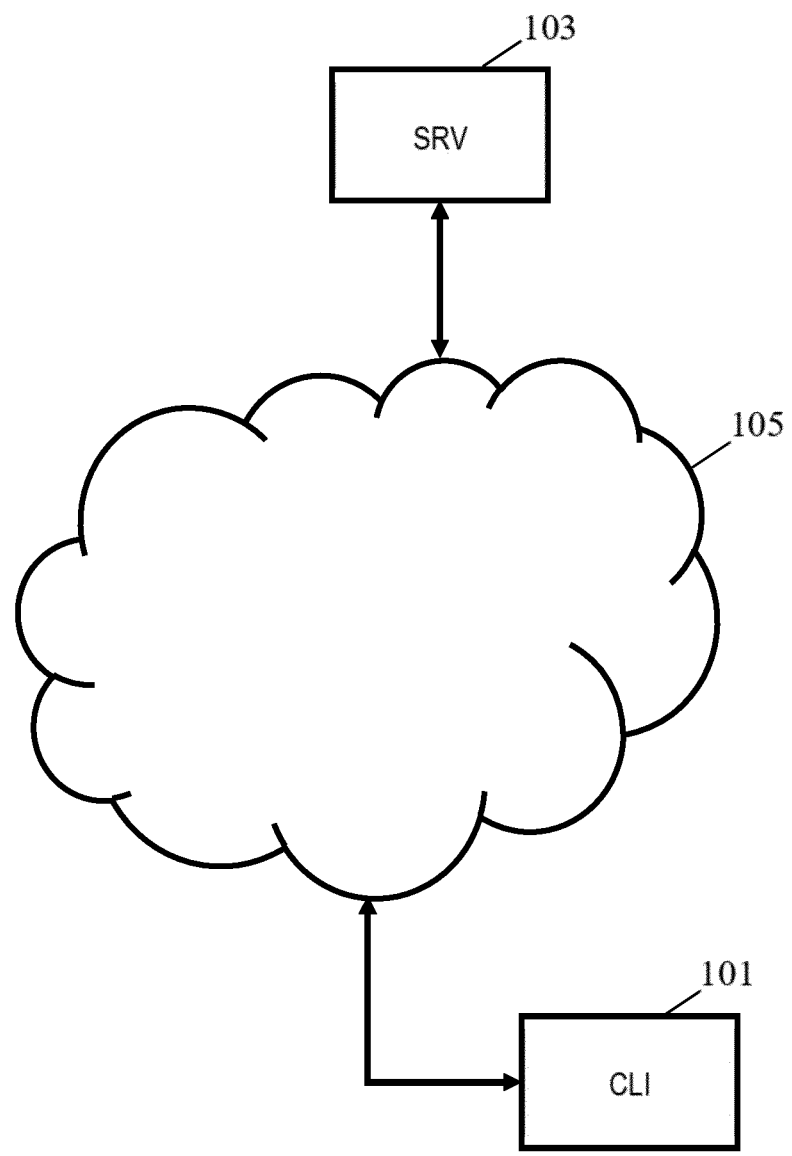
FIG. 1 illustrates an example of an arrangement for providing a virtual reality experience.

Virtual experiences allowing a user to move around in a virtual world are becoming increasingly popular and services are being developed to satisfy such a demand. However, provision of efficient virtual reality services is very challenging, in particular if the experience is to be based on a capture of a real-world environment rather than on a fully virtually generated artificial world.

In many virtual reality applications, a viewer pose input is determined reflecting the pose of a virtual viewer in the scene. The virtual reality apparatus/system/application then generates one or more images corresponding to the views and viewports of the scene for a viewer corresponding to the viewer pose.

Typically, the virtual reality application generates a three-dimensional output in the form of separate view images for the left and the right eyes. These may then be presented to the user by suitable means, such as typically individual left and right eye displays of a VR headset. In other embodiments, the image may e.g. be presented on an autostereoscopic display (in which case a larger number of view images may be generated for the viewer pose), or indeed in some embodiments only a single two-dimensional image may be generated (e.g. using a conventional two-dimensional display).

The viewer pose input may be determined in different ways in different applications. In many embodiments, the physical movement of a user may be tracked directly. For example, a camera surveying a user area may detect and track the user's head (or even eyes). In many embodiments, the user may wear a VR headset which can be tracked by external and/or internal means. For example, the headset may comprise accelerometers and gyroscopes providing information on the movement and rotation of the headset and thus the head. In some examples, the VR headset may transmit signals or comprise (e.g. visual) identifiers that enable an external sensor to determine the movement of the VR headset.

In some systems, the viewer pose may be provided by manual means, e.g. by the user manually controlling a joystick or similar manual input. For example, the user may manually move the virtual viewer around in the scene by controlling a first analog joystick with one hand and manually controlling the direction in which the virtual viewer is looking by manually moving a second analog joystick with the other hand.

In some applications a combination of manual and automated approaches may be used to generate the input viewer pose. For example, a headset may track the orientation of the head and the movement/position of the viewer in the scene may be controlled by the user using a joystick.

The generation of images is based on a suitable representation of the virtual world/environment/scene. In some applications, a full three-dimensional model may be provided for the scene and the views of the scene from a specific viewer pose can be determined by evaluating this model. In other systems, the scene may be represented by image data corresponding to views captured from different capture poses, and specifically may be represented by a plurality of source images with associated depth, where each image represents the scene from a different viewpoint. In such approaches, view images for other poses than the capture pose(s) may be generated by three dimensional image processing, such as specifically using view shifting algorithms. In systems where the scene is described/referenced by view data stored for discrete view points/positions/poses, these may also be referred to as anchor view points/positions/poses. Typically, when a real world environment has been captured by capturing images from different points/positions/poses, these capture points/positions/poses are also the anchor points/positions/poses.

A typical VR application accordingly provides (at least) images corresponding to viewports for the scene for the current viewer pose with the images being dynamically updated to reflect changes in the viewer pose and with the images being generated based on data representing the virtual scene/environment/world.

In the field, the terms placement and pose are used as a common term for position and/or direction/orientation. The combination of the position and direction/orientation of e.g. an object, a camera, a head, or a view may be referred to as a pose or placement. Thus, a placement or pose indication may comprise six values/components/degrees of freedom with each value/component typically describing an individual property of the position/location or the orientation/direction of the corresponding object. Of course, in many situations, a placement or pose may be considered or represented with fewer components, for example if one or more components is considered fixed or irrelevant (e.g. if all objects are considered to be at the same height and have a horizontal orientation, four components may provide a full representation of the pose of an object). In the following, the term pose is used to refer to a position and/or orientation which may be represented by one to six values (corresponding to the maximum possible degrees of freedom).

Many VR applications are based on a pose having the maximum degrees of freedom, i.e. three degrees of freedom of each of the position and the orientation resulting in a total of six degrees of freedom. A pose may thus be represented by a set or vector of six values representing the six degrees of freedom and thus a pose vector may provide a three-dimensional position and/or a three-dimensional direction indication. However, it will be appreciated that in other embodiments, the pose may be represented by fewer values.

A pose may be at least one of an orientation and a position. A pose value may be indicative of at least one of an orientation value and a position value.

A system or entity based on providing the maximum degree of freedom for the viewer is typically referred to as having 6 Degrees of Freedom (6DoF). Many systems and entities provide only an orientation or position and these are typically known as having 3 Degrees of Freedom (3DoF).

In some systems, the VR application may be provided locally to a viewer by e.g. a stand alone device that receives scene data (independent of the specific viewer pose for a local viewer) from a remote device/server and then locally generates view images for the specific current views of the local viewer. Thus, in many applications, especially for broadcast services, a source may transmit scene data in the form of an image (including video) representation of the scene which is independent of the viewer pose. For example, an image representation comprising a plurality of captured view images and associated depth maps may be received. The individual clients may then locally synthesize view images corresponding to the current viewer pose.

A particular application which is attracting particular interest is where a limited amount of movement is supported such that the presented views are updated to follow small movements and rotations corresponding to a substantially static viewer making only small head movements and rotations of the head. For example, a viewer sitting down can turn his head and move it slightly with the presented views/images being adapted to follow these pose changes. Such an approach may provide a highly and immersive e.g. video experience. For example, a viewer watching a sports event may feel that he is present at a particular spot in the arena.

Such limited freedom applications have the advantage of providing an improved experience while not requiring an accurate representation of a scene from many different positions thereby substantially reducing the capture requirements. Similarly, the amount of data that needs to be provided to a renderer can be reduced substantially. Indeed, in many scenarios, only image and typically depth data for a single viewpoint need to be provided with the local renderer being able to generate the desired views from this. In order to support head rotations, it is typically desired that a large area of the view from the viewpoint is represented by the provided data, and preferably the whole surface of a view sphere centered on the view point is covered by the provided image and depth data. The approach may specifically be highly suitable for applications where the data needs to be communicated from a source to a destination over a bandlimited communication channel, such as for example for a broadcast or client server application.

FIG. 1 illustrates such an example of a VR system in which a remote VR client device 101 liaises with a VR server 103 e.g. via a network 105, such as the Internet. The server 103 may be arranged to simultaneously support a potentially large number of client devices 101.

The VR server 103 may for example support a broadcast experience by transmitting image data and depth for a plurality of viewpoints with the client devices then being arranged to process this information to locally synthesize view images corresponding to the current pose.

In order to provide an efficient distribution, it is desirable for the data rate to be kept as low as possible for a given image quality, and thus may specifically include seeking to reduce the amount of redundant data which is generated.

Figure 2:
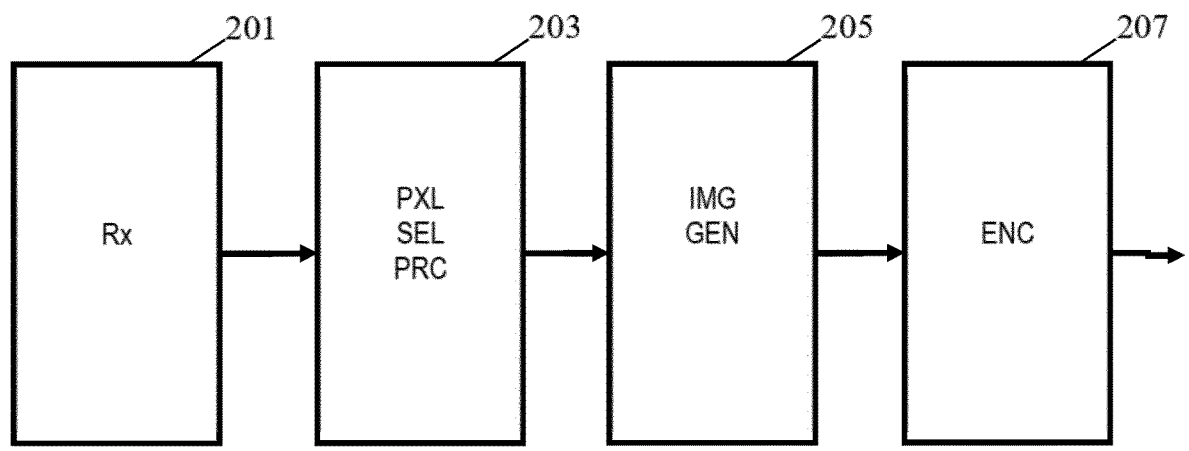
FIG. 2 illustrates an example of elements of an image signal transmitter in accordance with some embodiments of the invention.

FIG. 2 illustrates an example of an apparatus for generating an image signal which includes a representation of a plurality of images of the scene from different view poses (anchor poses). The apparatus will also be referred to as an image signal transmitter 200. The image signal transmitter 200 may for example be comprised in the VR server 103 of FIG. 1.

Figure 3:
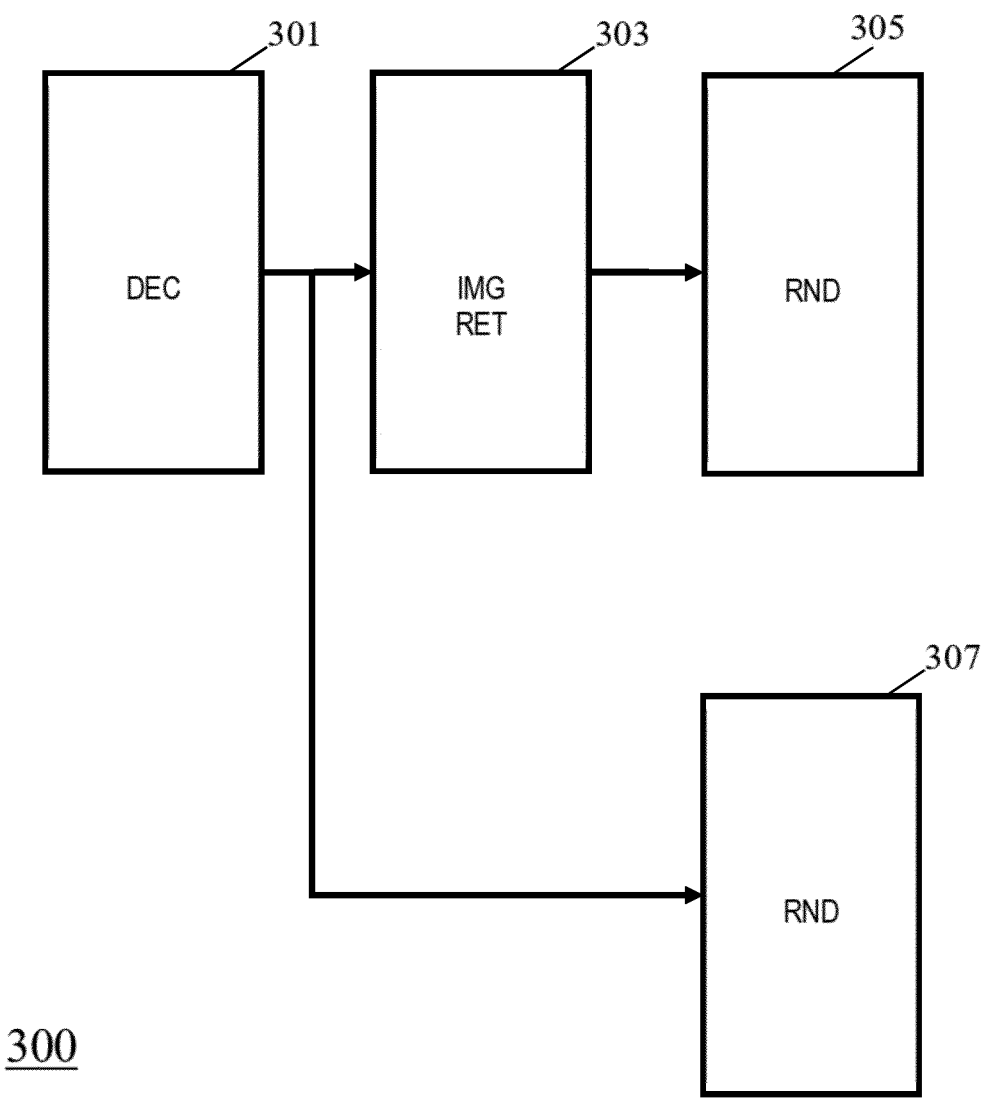
FIG. 3 illustrates an example of elements of an image signal receiver in accordance with some embodiments of the invention.

FIG. 3 illustrates an example of an apparatus for rendering view images based on a received image signal which includes a representation of a plurality of images of the scene. The apparatus may specifically receive the data signal generated by the apparatus of FIG. 2 and proceed to process this in order to render images for specific view poses. The apparatus of FIG. 3 will also be referred to as an image signal receiver 300. The image signal receiver 300 may for example be comprised in the client device 101 of FIG. 1.

The image signal transmitter 200 comprises an image source receiver 201 which is arranged to receive a plurality of source images of the scene. The source images may represent views of the scene from different capture poses. For example, the source images may comprise images from a row of equidistant capture poses.

In many embodiments, the source images may be 3D images comprising 2D images with associated depth information. The 2D images may specifically be view images for viewports of the scene from the corresponding capture pose, and the 2D image may be accompanied by a depth image or map comprising depth values for each of the pixels of the 2D image. The 2D image may be a texture map.

The depth values may for example be disparity values or distance values, e.g. indicated by a z-coordinate. In some embodiments, a source image may be a 3D image in the form of a texture map with an associated 3D mesh. In some embodiments, such texture maps and mesh representations may be converted into image plus depth representations by the image source receiver before further processing by the image signal transmitter 200.

The image source receiver 201 accordingly receives a plurality of source images that characterize and represent the scene from different poses. Such a set of source images will allow view images to be generated for other poses using algorithms such as view shifting as will be known to the skilled person. Accordingly, the image signal transmitter 200 is arranged to generate an image signal that comprises image data for the source images and transmit this data to a remote device for local rendering. However, directly transmitting all the source images will require an unfeasibly high data rate and will comprise a large amount of redundant information.

The image signal transmitter 200 is arranged to reduce the data rate by generating partial images in which redundant information has been removed. The partial images are subsequently combined and encoded to generate the image signal.

The image source receiver 201 is coupled to a pixel selector 203 which is arranged to generate a set of images from the source images where at least one of the set of images is a partial image. The pixel selector 203 may generate the set of partial images by generating partial versions of one or typically most (or even all) of the source images by selecting a subset of the pixels in the source image to include in the image signal. A partial image will also be referred to as a pruned image and the selection of a subset of pixels of an image to generate a partial image thereof will also be referred to as pruning the image.

Thus, the output of the pixel selector 203 may be a set of pruned or partial images corresponding to the source images but with one or typically most of the images being partial versions of the corresponding source image. The pixel selector 203 seeks to select this subset of pixels to include in a partial image such that the overall redundancy of the generated set of partial images is reduced or preferably minimized. The generated partial images may also include one or more original source images that have not been pruned.

The pixel selector 203 is coupled to an image generator 205 which is fed the set of partial images. The image generator 205 is arranged to combine the partial images into combined images where each image may represent one or more of the partial images. Specifically, a combined image may include pixels originating from a plurality of the partial images. For example, pixels from one partial image may be inserted into unused areas of another partial image. The image generator 205 can be seen as packing the partial images into combined images that are more densely packed.

The image generator 205 generates fewer but less sparse images. The set of combined images are fed to an encoder 207 which proceeds to perform the encoding of the images. Since the image generator 205 has reduced the number of images to transmit, a more efficient encoding is typically achieved. Further the packing of the partial images into combined images may typically be performed such that the resulting images are highly suitable for encoding.

A particular advantage of the approach is that the representation of the scene by partial images is achieved in a way that allow conventional image and video encoding approaches to be performed by the encoder 207. For example, in many embodiments encoding formats such as High Efficiency Video Coding (HEVC), also known as H.265 and MPEG-H Part 2, or Versatile Video Coding (VVC) developed by the Joint Video Exploration Team (JVET) may be used.

The image signal transmitter 200 of FIG. 2 may accordingly provide an efficient approach for generating an efficient image signal representing a scene from a range of view poses.

The image signal is transmitted to an image signal receiver 300 which comprises a decoder 301 that is arranged to receive the image signal and to decode this to generate the set of combined images that were fed to the encoder 207. Thus, the decoder 301 may be arranged to perform a decoding according to the standard that was used by the encoder 207, such as for example by performing a HEVC or VVC decoding.

It will be appreciated that the image signal transmitter 200 and the image signal receiver 300 further comprises required functionality for communicating the image signal including functionality for encoding, modulating, transmitting, receiving etc. the image signal. It will be appreciated that such functionality will depend on the preferences and requirements of the individual embodiment and that such techniques will be known to the person skilled in the art and therefore for clarity and brevity will not be discussed further herein.

The decoder 301 is coupled to an image retriever 303 which is arranged to retrieve the partial images from the received combined images. The image retriever 303 may accordingly perform the reverse function of the image generator 205 in order to divide the pixels of a combined image out into individual partial images. Thus, whereas the combined image typically comprises pixels corresponding to a plurality of different viewpoints or poses, the partial images are generated such that each image comprises pixels originating from only one source image and thus corresponding to only one view pose.

In many embodiments the image signal also comprises one or more complete source images and the output of the image retriever 303 accordingly provides set of images corresponding to the source images, and thus representing the scene from a range of view poses, with one or more of the images being only a partial image. However, the missing part from a given partial image typically corresponds to redundant information that is available from other images of the output set of images from the image retriever 303.

The images are fed to a first renderer 305 which is arranged to generate new view images based on the set off partial images (and any full images) received. These images correspond to the original source images. It will be appreciated that any suitable algorithm for rendering a view image corresponding to a given viewer pose may be used. For example, the first renderer 305 may be arranged to first generate a view image based on a received full source image. This may typically result in a number of holes resulting from the occlusion due to the changed viewpoint. Such holes may then be filled in using data from the partial images. It will be appreciated that the skilled person will be aware of many different algorithms and approaches for synthesizing views for specific purposes based on images from other viewpoints and that any suitable algorithm may be implemented by the first renderer 305.

In some embodiments, the image signal receiver 300 may include a second renderer 307 which is arranged to synthesize view images directly from the received combined images. In many embodiments, the image signal receiver 300 will comprise either the first renderer 305 and the image retriever 303, or the second renderer 307. It will be appreciated that the second renderer 307 may use any suitable approach for rendering view images for a given viewer pose.

The first and second renderers may use the same synthesis method and parameters which may be advantageous as it may increase the value of the predictions.

It will be appreciated that any suitable approach or method for generating the partial images may be used. For example, in some embodiments, the pixel selector 203 may iteratively generate a set of partial images by in each iteration selecting a new input image for which it then generates a partial image that is added to the set of partial images. The image may in each iteration be selected e.g. randomly or in order of distance from a center position of the capture poses. The pixel selector 203 may then try to predict the selected image from the partial images previously selected.

A predicted image for a first candidate image of the set of candidate images from a first included image from the set of included images may be an image for the view pose of the first candidate image generated by view synthesis from the first included image. As the first included image and the first candidate image correspond to source images for different view poses, the view synthesis includes a view pose shift, and typically a view position shift. The view synthesis may be a view shift image synthesis. Thus, the predicted image for a first candidate image from a first included image may be an image that reflects how well the viewport from the view pose of the candidate image can be predicted/estimated from the first included image.

A prediction of a first image from a second image may specifically be a view synthesis of an image at the view pose of the first image based on the second image (and the view pose of this). Thus, a prediction operation to predict a first image from a second image may be a view pose shift of the second image from the view pose associated with this to the view pose of the first image.

It will be appreciated that different methods and algorithms for view synthesis and prediction may be used in different embodiments. In many embodiments, a view synthesis/prediction algorithm may be used which as an input takes a synthesis view pose for which the synthesized image is to be generated, and a plurality of input images each of which is associated with a different view pose. The view synthesis algorithm may then generate the synthesized image for this view pose based on the input images that may typically include both a texture map and depth.

A number of such algorithms are known, and any suitable algorithm may be used without detracting from the Invention. As an example of such an approach, intermediate synthesis/prediction images may first be generated for each input image. This may for example be achieved by first generating a mesh for the input image based on the depth map of the image. The mesh may then be warped/shifted from the view pose of the input image to the synthesis view pose based on geometric calculations. The vertices of the resulting mesh may then be projected onto the intermediate synthesis/prediction image and the texture map may be overlaid this image. Such a process may for example be implemented using vertex processing and fragment shaders known from e.g. standard graphic pipelines.

In this way, an intermediate synthesis/prediction image (henceforth just intermediate prediction image) for the synthesis view pose may be generated for each of the input images.

The intermediate prediction images may then be combined together, e.g. by a weighted combination/summation or by a selection combining. For example, in some embodiments, each pixel of the synthesis/prediction image for the synthesis view pose may be generated by selecting the pixel from the intermediate prediction image which is furthest forward, or the pixel may be generated by a weighted summation of the corresponding pixel value for all the intermediate prediction images where the weight for a given intermediate prediction image depends on the depth determined for that pixel. The combination operation is also known as a blending operation.

The pixel selector 203 may thus generate a prediction for the selected image in a given iteration based on the partial images selected in previous iterations. It may compare the predicted image to the selected image and identify each pixel which is not predicted sufficiently accurate, for example by determining if a difference measure for the corresponding pixels in the predicted and selected image are above a threshold. The partial image may then be generated to comprise only these pixels, and thus the partial image does not include pixels that can be predicted sufficiently accurately by the previously selected partial images. The partial image is then added to the set of partial images and the pixel selector 205 proceeds to the next iteration where a new image is selected.

In some embodiments, the image may be selected as the image that is least accurately predicted from the previously selected partial images.

In many embodiments, the pixel selector 203 may thus generate partial images which for each of the view source images indicate a set of pixels for which pixel value data/image data should be included in the image signal and a set of pixels for which pixel value data/image data should not be included in the image signal. The partial image for a given source image may simply indicate these two subsets by including the pixel values of pixels belonging to the first set and not including the pixel values of pixels belonging to the latter set, but e.g. instead comprising a predetermined constant pixel value (e.g. zero). It will be appreciated that in many embodiments, pixels are included in the partial image or not based on an assessment of their capability for improving predictions of views for other viewpoints, but that any suitable approach may be used, and that the approach described for efficiently packing and communicating such partial images is not dependent on any specific approach for generating the partial images. It will also be appreciated that references to a pixel value includes a reference to multiple values for a given pixel. For example, a pixel value may be a vector comprising a plurality of values, such as values for different color channels, transparency and/or depth.

Figure 4:
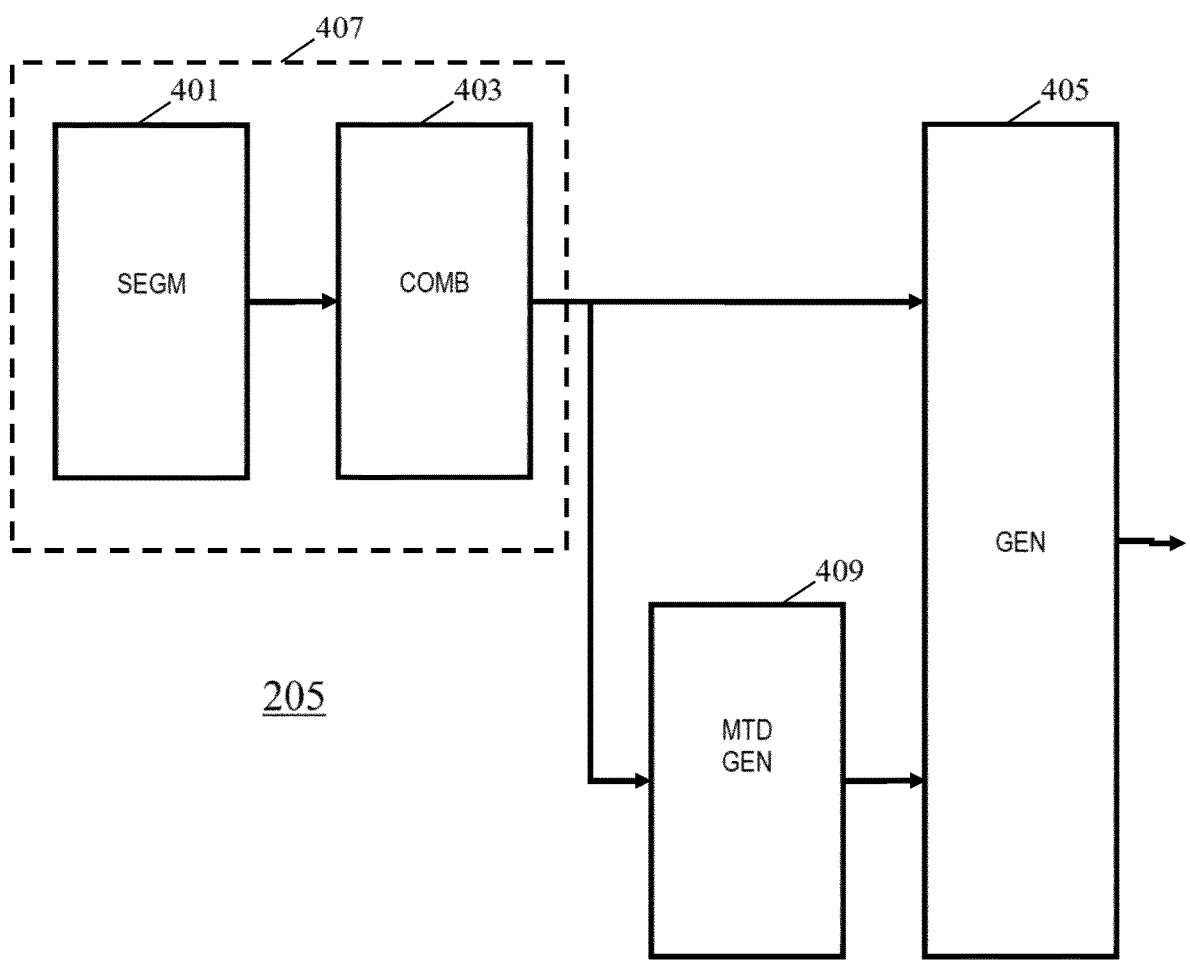
FIG. 4 illustrates an example of elements of an image generator for an image signal transmitter in accordance with some embodiments of the invention.

FIG. 4 illustrates an example of some elements of the image generator 205. The image generator 205 is fed the partial images and proceeds to combine these into fewer combined images. The combination is based on a segmentation of the images and on combining the segmented partial images into one or more segmented combined images. The segmentation and combination are based on a hierarchical segmentation and combination using segments of different sizes and outlines where larger segments are subdivided into smaller segments. The segmentation and combination of the partial images is accordingly hierarchical and metadata in the form of a tree data structure is generated to describe the contents of the combined image(s).

The image generator 205 comprises a segmenter 401 which receives the partial images from the pixel selector 203. The segmenter 401 is arranged to generate a segmented partial image for each of the partial images, and thus for each of the original view source images. The segmenter 401 may specifically divide the partial images into segments that have outlines selected from a set of predetermined outlines.

Thus, a set of segment outlines may be selected, and the segmentation of a partial image is based on a restriction that the outline of a segment must be selected from one of these. An outline of a segment may correspond to a size and shape of a segment. For example, segments may be restricted to be rectangular and the outline may be defined by a width and height (vertical and horizontal segment dimension), e.g. measured in pixels.

The segment outlines may be hierarchically related such that smaller segments are subdivisions of larger segments.

For example, the set of segment outlines may include one or more segments having a largest size. For example, the largest segment outline may be a rectangular segment having a given pixel dimension. The largest segment outline may specifically be equal to the entire image.

The next level of segment outlines may then be selected as a subdivision of the largest outline, e.g. using a given subdivision, such as dividing the segment into two halves by a horizontal division. In some embodiments, a plurality of subdivision may be used, e.g. another set of outlines may be generated dividing the segment into two halves by a vertical division. The next level of segment outlines may be generated by using the same (or different) subdivisions, and so forth. Thus, the set of possible segment outlines may comprise outlines of different sizes and possibly different shapes.

The segmenter 401 may proceed to divide the partial image into segments with outlines selected from the set of predetermined/possible outlines. The segments are generated such that some segments comprise pixels providing image data (as well as possibly pixels not providing image data) and some segments comprise only pixels that do not provide image data. Thus, image segments are generated which do not include any image data and image segments that do. The image segments that do not include image data (the unused segments) may then be discarded whereas image segments that do include image data (the used segments) will be included in one of the combined images.

Thus, the segmenter may tile a partial image by dividing it into used segments and unused segments by fitting the predetermined outlines to regions of pixels belonging to the second set of pixels. For example, the segmenter 401 may start with a segment corresponding to the entire image. It may then divide the segment into four subsegments. For each of the subsegments, the segmenter 401 may determine if the segment comprises any used pixels (pixels for which the partial image includes image data). If not, the segment is not processed further but is designated as an unused segment. However, if it does include any used pixels, the process of subdividing the segment is repeated. The process may be repeated until the segments comprising used pixels have reached the minimum size allowed for segments. The image is now divided into unused segments which have the largest size for the given segment shape that fits the region of unused pixels and a typically large number of minimum size segments that comprise used pixels. The segmenter 401 may now proceed to combine the minimum size segments with used pixels into larger segments, e.g. by iteratively combining smaller segments into larger ones if all subdivisions of the larger segment comprise used pixels. This will create larger used segments and thus the process will result in a set of used segments and a set of unused segments.

In some embodiments, multiple subdivisions of a given segment may be possible and the segmenter 401 may select between these using a given criterion, such as for example selecting the subdivision that results in the biggest difference between the concentration of used pixels in the different segments, i.e. in the largest unbalance.

It will be appreciated that many other approaches or algorithms for generating a hierarchically segmented partial image may be used.

The segmenter 401 may proceed to generate segmented partial images for all the view source images and these segmented partial images are then fed to a combiner 403 which is arranged to generate one or more combined partial images. The following description will focus on the generation of a single combined partial image but it will be appreciated that in many embodiments a plurality of partial images may be generated.

The combiner 403 may specifically include the generated used segments for a plurality of partial images into a single combined image. For example, in some embodiments, the combiner 403 may start by selecting one segmented partial image, such as e.g. the segmented partial image for which the used segments cover the largest area, as an initial combined partial image. The combiner 403 may then select a second segmented partial image and proceed to fill unused segments of the combined partial image by used segments of the second segmented partial image. For example, the combiner 403 may sequentially select each used segment in the second segmented partial image and for each of these identify an unused segment in the combined partial image with the same outline. The used segment of the second segmented partial image is then moved into the unused segment in the combined partial image (e.g. by copying the pixel values) after which this is designated as a used segment. The combiner 403 may then proceed to select a third segmented partial image and proceed to include used segments of this into unused segments of the combined partial image. The approach may be repeated for the segmented partial images until all of these have been processed, or until no suitable unused segments are available in the combined partial image, in which case a new combined partial image may be initiated.

It will be appreciated that in many embodiments a more complex algorithm may be used which seeks to provide a better optimization of the combining of the segments of the segmented partial images, including e.g. combining or dividing segments to provide a better fit.

The combined partial image accordingly comprises used segments from a plurality of partial images. Some of the segments may be positioned in the same position in the combined partial image as in the segmented partial image whereas other segments may have been moved to fit in an unused segment of the combined partial image.

Accordingly, the combiner 403 may for each used segment store origin or source data indicative of the origin or source for the segment. Specifically, the origin data may indicate the segmented partial image from which the segment was selected as well as typically data reflecting the difference between the position of the segment in the combined partial image and the position in the segmented partial image.

Figure 5:
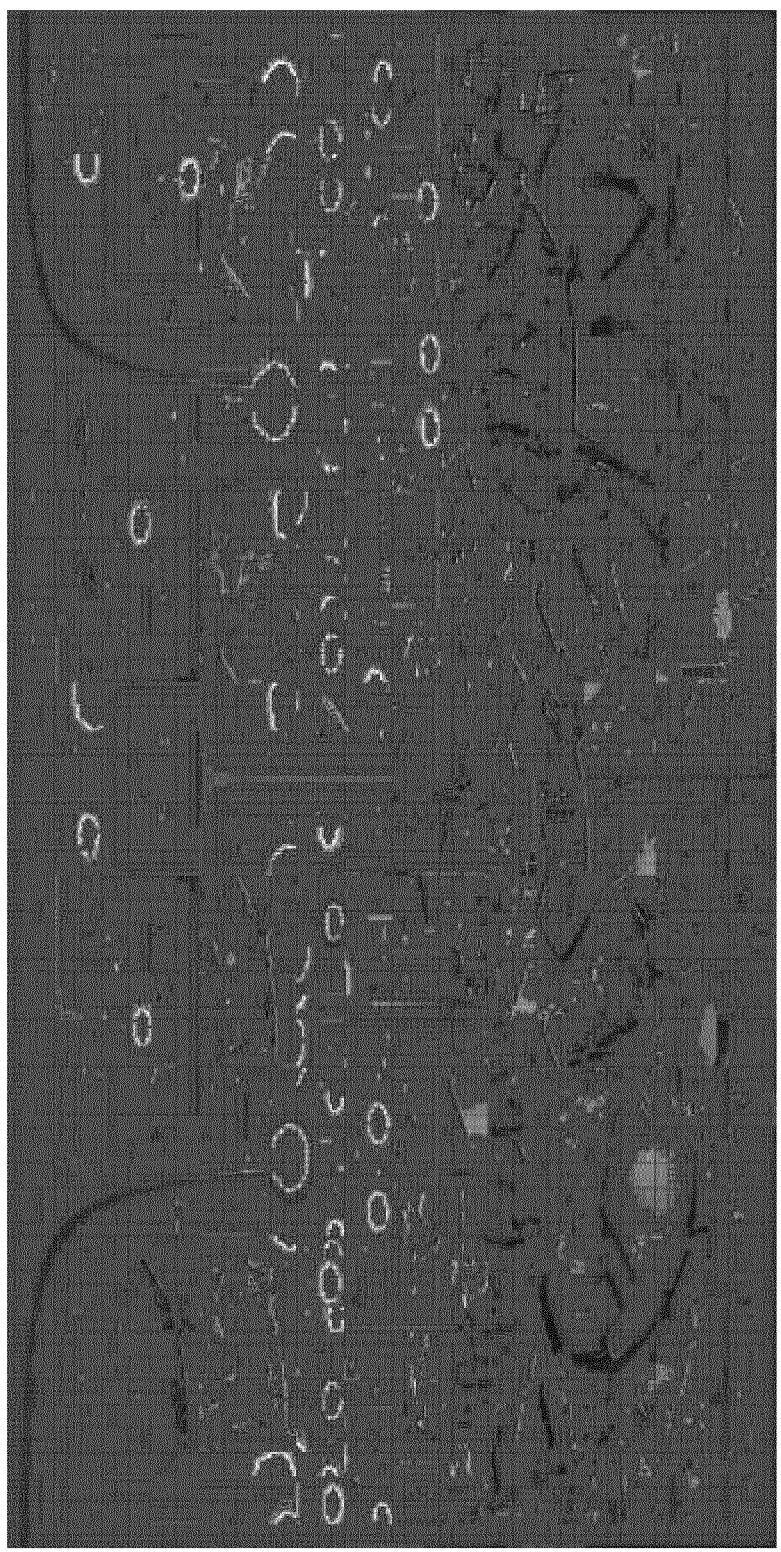
FIG. 5 illustrates an example of a combined partial image in accordance with some embodiments of the invention.
Figure 6:
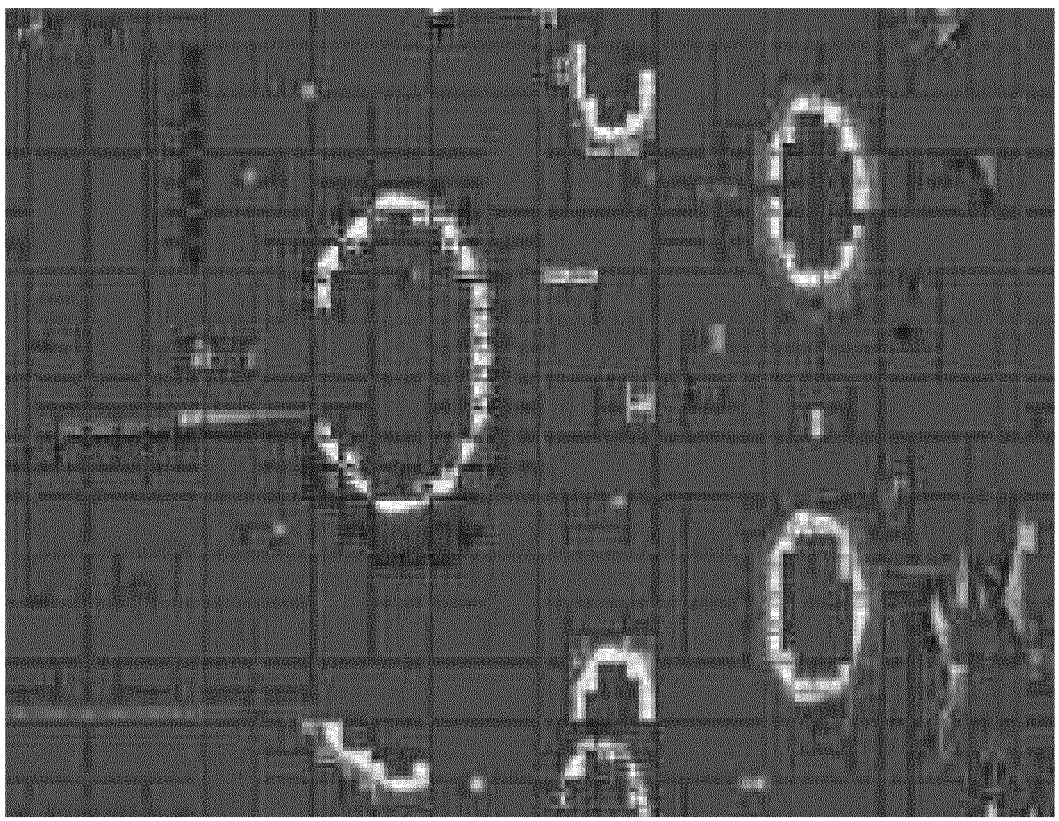
FIG. 6 illustrates an example of a zoomed in combined partial image in accordance with some embodiments of the invention.

The combiner 403 may thus generate a combined partial image which is segmented into segments of different sizes and with segments comprising pixel values from different segmented partial images. FIG. 5 illustrates an example of combined partial image and FIG. 6 illustrates a close up on a section of the combined partial image of FIG. 5.

A specific example of an algorithm that may be used in generating the combined partial image is the following:
1. Set the largest node size to the largest power of two that is at most the width or height of the smallest frame (1024 for 1080p).
2. Generate a set of scale invariant node types from a smallest to a largest node size using powers of two, e.g. (8, 8), (16, 8), (8, 16), (16, 16), (32, 8), etc. with the same subdivisions on different scales, such as splitting blocks halfway horizontally or vertically.
3. Enumerate all the source view and packed view frame sizes.

4. In order of increasing frame size:
   a. Maintain a first list of rectangular boxes and insert a box for the entire frame.
   b. Maintain a second list of boxes that starts out empty.
   c. Iteratively, until the first list is empty,
      i. Take a rectangle from the list,
      ii. Find the largest node type that fits within the rectangle,
      iii. Tile the rectangle, adding boxes to the second list.
      iv. Divide any remaining pixels into rectangles and add to the first list.
   d. Create a node type for the frame size including a single subdivision according to the boxes in the second list.

The generated combined partial images are fed to an image signal generator 405 which is fed the combined partial image(s). Thus, the segmenter 401 and combiner 403 form an image source 407 providing one or more combined partial images with each of the combined partial images being divided into segments of different sizes and with some segments being used and comprising image data from a view source image, and other segments being unused and not comprising image data from a view source image.

The image signal generator 405 is arranged to generate an image signal which comprises the combined partial image and may specifically comprise/correspond to the encoder 207.

However, in addition to the image data, the image generator 205 further comprises a metadata generator 409 which is arranged to generate metadata which is fed to the image signal generator 405 and also included in the image signal.

The metadata is generated to be indicative of the image data content of the combined partial image(s), and may specifically indicate the segmentation of the combined partial image as well as the relation between individual segments in the combined partial image and in the segmented partial images.

Figure 7:
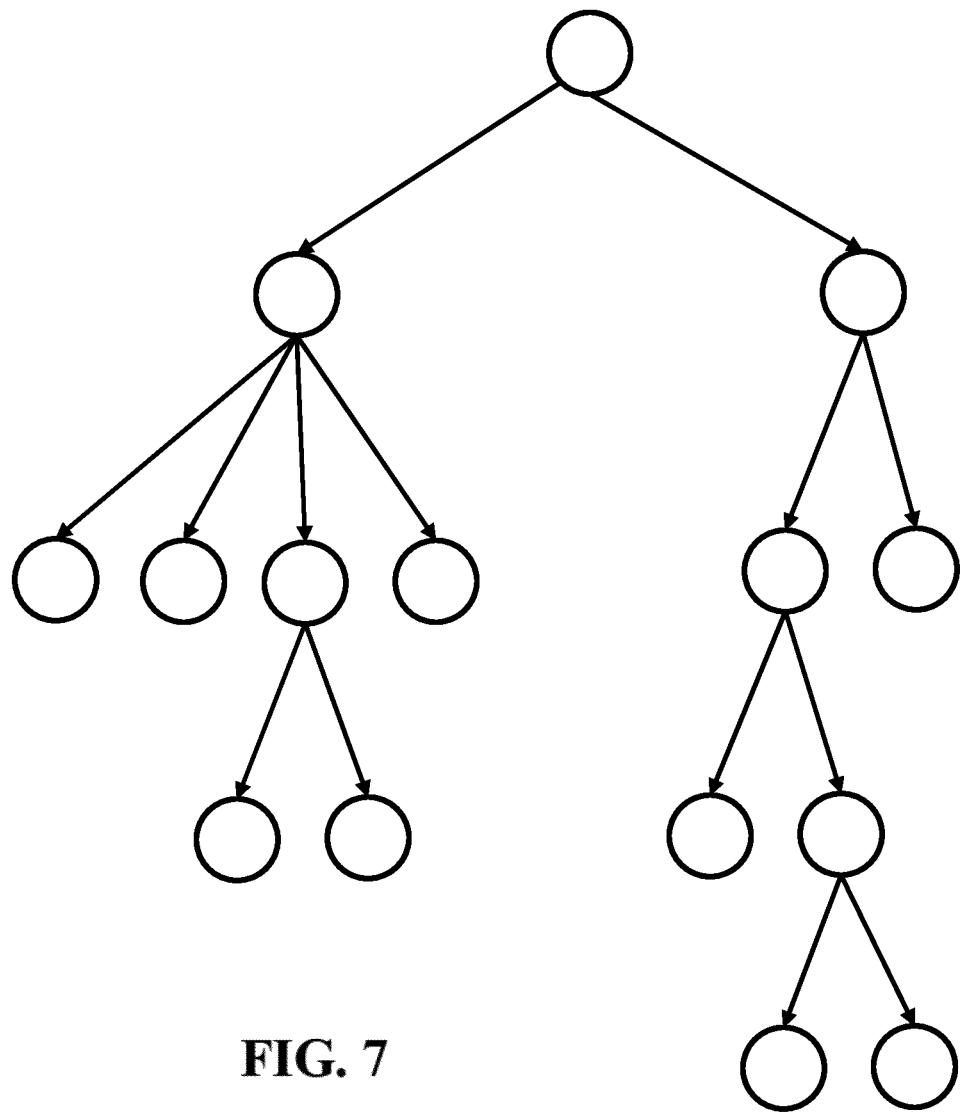
FIG. 7 illustrates an example of a tree data structure in accordance with some embodiments of the invention.

The image data and the metadata is structured in accordance with a tree data structure that reflects the segmentation of the combined partial image. An example of a tree data structure is illustrated in FIG. 7. The metadata specifically comprises a tree data structure where each node is linked to a segment of the combined partial image. The segment linked to a given segment may either be one of the defined used or unused segments or may be a combination of a plurality of these, i.e. a node may be linked to a segment in the combined partial image which has an outline and position equal to one of the used or unused combined partial images formed in the image, or to a combined outline and position of a plurality of adjacent segments. Each node may be linked to a segment in the sense that it is linked to region corresponding to a segment or a combination of contiguous plurality of segments of the set of segments that were generated and included in the combined partial image by the combiner 403.

A node of the tree data structure is either a branch node or a leaf node.

A branch node is a parent node which has one or typically more child nodes. The child nodes of a branch node represent the subsegments of the segment of the branch node in accordance with a subdivision of the segment of the branch node.

Thus, for example, a branch node may be linked to a segment of, say, 100×200 pixels at a given position in the combined partial image. The branch node may be linked with a subdivision dividing a segment into four equal segments, and thus the segment may be subdivided into four corner segments of size 25×50 pixels. For each of these segments, the tree data structure may comprise a child node of the branch node.

Thus, branch nodes represent the divisions of segments into smaller segments.

A leaf node does not have child nodes and thus corresponds to a segment of the combined partial image that is not further subdivided. The leaf nodes may accordingly correspond to the used and unused segments generated by the combiner 403.

For example, in the above example, if the four 25×50 pixel segments are generated as used or unused segments by the combiner 403 they will not be further subdivided and thus have no child nodes.

However, if for example, one of the 25×50 pixel segments covers, say, one used and one unused segment, the node for this segment will instead of being a leaf node be a branch node having two children, one corresponding to a leaf node for the used segment and one corresponding to a leaf node for the unused segment.

Whereas branch nodes correspond to segments that are further subdivided in the combined partial image and which do not directly match one used or unused segment, the leaf nodes are not subdivided but directly linked to either a used segment or an unused segment.

Thus, a leaf node leaf is either an unused leaf node linked to a segment for which the first image comprises no image data, i.e. linked to an unused segment, or is a used leaf node linked to a segment for which the first image comprises image data, i.e. linked to a used segment of the combined partial image.

The tree data structure accordingly has a structure and configuration that directly matches the combined partial image and the segmentation therefor. The tree data structure comprises a leaf node for each generated used and unused segment in the combined partial image. The tree data structure further comprises a number of branch nodes which define the segmentation and specifically the subdivisions of segments performed to efficiently pack the segments from the different partial images together in the combined partial image.

The metadata generator 409 generates metadata describing the tree data structure and specifically generates metadata indicating whether each node is a branch node, a used leaf node, or an unused leaf node. The metadata is fed to the image signal generator 405 and included in the image signal.

In many embodiments, the root node of the tree data structure may be linked with a segment corresponding to the entire combined partial image. This may provide an efficient approach with one tree data structure providing information for the whole image. Thus, in many embodiments, one tree data structure may be provided for each combined partial image.

The tree data structure describes the segmentation of the combined partial image and the allocation of segments as either used or unused segments. Further, in many embodiments, the tree data structure may comprise additional information for the segments. Specifically, the metadata may for each leaf node comprise data indicating one or more properties for the corresponding segment.

It will be appreciated that in different embodiments, different data may be included. For example, for used segments, an indication may be provided of the proportion of pixels within the segment that are used pixels, i.e. whether it is a sparsely or densely packed segment.

However, in most embodiments, the metadata comprises an indication for at least some used leaf nodes of the view source image and partial image which is the origin for the used segment linked to the leaf node. In many embodiments, the metadata also comprises an indication of a position difference (including e.g. a rotation/orientation) between the position of the segment in the combined partial image and the position in the original view source image/partial image. For example, translational information may be included for the used segments. The approach may in this way provide a very efficient communication of the contents of the combined partial image and how this can be unpacked to provide the original partial images.

In some embodiments, explicit origin data may only be included for some of the used segments/leaf nodes. For example, the absence of explicit origin data may be indicative of a default origin of the base partial image for the combined partial image and for a segment at the same position. As a more advanced example, multiple predictions are generated and the metadata includes either the origin data or a selection of one of the predictions.

Indeed, whereas it is typically preferably to include at least some origin data in the metadata/image signal for at least one segment in order to provide improved flexibility and adaptability, it is in other embodiments possible for the image signal and metadata not to include any origin data at all.

In some embodiments, origin data may for example be provided separately from the image signal, e.g. through other means. Typically for e.g. video frames, the image segmentation may be much slower than the individual image frame content changes and the same image segmentation may be used for multiple frames, and possibly for a very large number of frames. In such an example, the image signal comprising the video frames may be communicated through a high speed communication channel whereas the origin data may be provided in a completely separate signal and communicated through a different communication channel.

In some embodiments, it is possible for the image signal transmitter to not transmit any origin/source indication data whatsoever. For example, position or position difference data is typically only appropriate for embodiments where segments may be moved from the partial images to the combined image. In some embodiments, the generation of a combined image from a partial image may be such that segments are not moved and thus no position origin information is required or appropriate. Although such an approach may result in a less efficient packing of segments in the combined image, it may be advantageous in some applications as it may result in reduced complexity and facilitated processing. It may for example be suitable for applications where the most pertinent scene information tends to be present in different and specific regions of the different partial images.

Also, in some embodiments, indications of the the source/origin image is not needed for all of the view source images or indeed for some embodiments may not be needed for any of the view source images. For example, a predetermined relationship between positions or origins of segments in the view source images and the position or order of segments in the combined image(s) may be applied and this relationship may be applied individually and separately by both the image signal transmitter and the image signal receiver without requiring the image signal or metadata to describe the relationship. In some such cases, no origin data need to be communicated at all.

As a specific example, a fixed region of the combined image may be allocated to each of the partial images, such as for example a region corresponding to 50% of the combined image may be allocated to a first image, a region corresponding to 25% of the combined image may be allocated to a second image, a region corresponding to 15% of the combined image may be allocated to to a third image, and a region corresponding to 10% of the combined image may be allocated to to a fourth image. The pixel selection/segment generation may be subject to a requirement that the number of pixels selected/segments generated must be below the proportion of the combined image allocated to that image by a suitable margin (to allow for imperfect packing). The packing of the segments into the combined image may then be subject to the allocation of segments into the regions allocated for the segments of that partial image. The overall representation of the packing of the combined image may be by a hierarchical representation as described, and due to the known constraints for the segment position no further image origin data will be required.

In some embodiments, various combinations of requirements, constraints, and approaches may be utilized. For example, the combined image may be larger than the partial image to allow a more flexible packing allowing more packing constraints to be imposed (e.g. the packing may be such that positions of segments are maintained and each partial/source image is constrained to specific regions allocated to that image).

In some embodiments, special known or assumed image characteristics could be used to decide on suitable predetermined relationships between positions or sequences of segments in the source images and the order or position of segments in the combined image(s). For example, if the scene is one that is considered to be static throughout a given transmission with changes predominantly occurring in one region of the scene (e.g. a stage in a theatre), the specific areas corresponding to this region in the different view source images may be identified and used to determine a predetermined relationship that can be known at both the image signal transmitter and the image signal receiver, e.g. the identified region in the different partial images may be allocated to different regions in the combined image in a predetermined/known relationship.

Thus, in most embodiments, it will be preferable to include origin data indicative of a view image source and/or a position in a view image source for one or more of the segments of the combined image (specifically for at least one segment represented by a used leaf node). This approach will allow a more flexible and efficient approach in many embodiments. However, whereas this may often be advantageous, it is by no means necessary, essential, or required in all embodiments.

In some embodiments, only one possible subdivision of segments may be possible. For example, a subdivision of a rectangular segment may always be into four subsegments generated by dividing along vertical and horizontal center lines. In such cases, the metadata may comprise no additional information on the subdivision used for a given branch node.

However, in many embodiments, the segmentation of the partial images may allow different subdivisions to be used and specifically the subdivision may be selected from a set of allowed subdivisions. In such a case, the metadata may for one or more of the branch nodes comprise an indication of the subdivision applied to a segment of the branch node to generate the segments of the child nodes.

Specifically, the segmentation may be based on subdivisions selected from a set of allowable subdivisions, such as for example a division into two halves by a vertical center division, into two halves by a horizontal center division, into four quarters by a vertical and horizontal center division, etc. The metadata may then for a given branch node include data indicating which subdivision out of the set of allowable subdivisions has been used for the segment of the branch node.

Figure 8:
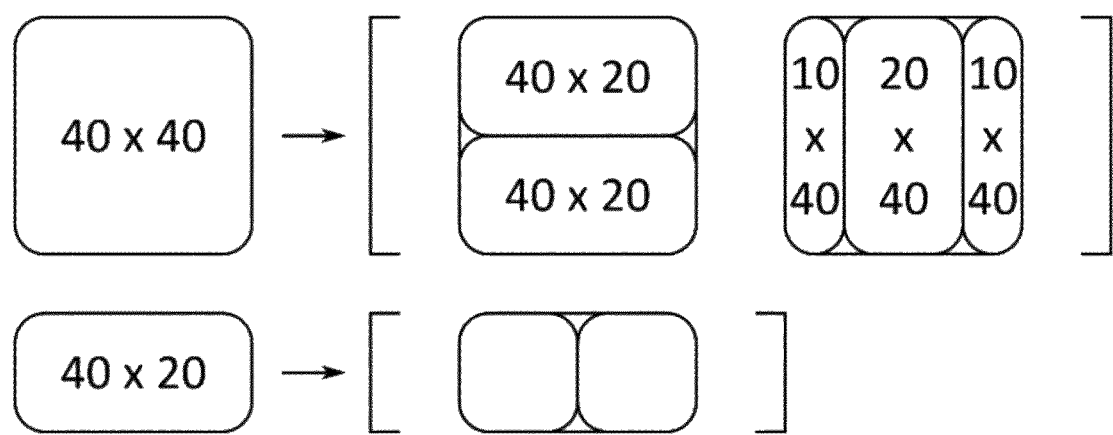
FIG. 8 illustrates an example of a subdivision of segments in accordance with some embodiments of the invention.

It will be appreciated that more complex subdivisions may be used and that the subdivisions may depend on the properties of the segments which may have different shapes and outlines. For instance, as illustrated in FIG. 8, it may be possible to split a (40, 40) pixel segment/node into two (40, 20) segments/nodes or two (10, 40) segments/nodes and one (20, 40) segment/node. A 40×40 segment/node accordingly has two subdivisions. A 40×20 segment/node may only have a single subdivision, such as e.g. into two 20×20 segments/nodes. Thus, the set of allowable subdivisions may also be dependent on the specific segment and specifically on the outline (size and/or shape).

In the described examples, the system uses segments that can be recursively subdivided until the smallest node size/segment. Thus, in the examples, the segments may all have outlines that can be generated as a combination of segments of the smallest size. Specifically, any given segment can be tiled by segments of minimum size. The segments can be seen to be generated by combining a basic building block corresponding to one (or possibly more) segments of a minimum size. Such an approach may have a number of advantages including:

Improving block-alignment with the video encoder (such as HEVC coding block trees)

Reducing the amount of metadata required as the segmentation can be represented with less data.

In many embodiments, the metadata generator 409 may also be arranged to generate configuration information which may be transmitted to the image signal receiver 300 for use in unpacking the combined partial images.

Specifically, in many embodiments, the image signal transmitter 200 may generate restrictive parameters for the segmentation and the tree data structure for the combined partial images. In many embodiments, the metadata may be generated to include an indication of the smallest segment that forms the basis for all other segments.

As another example, in many embodiments, the metadata may be generated to include an indication of which subdivisions are possible for the nodes/segments. For example, one or more sets of allowable subdivisions may be defined by providing outline data for the segment being divided (such as e.g. shape) and for the subsegments that will be formed for the specific subdivision. Each subdivision may be allocated an identifier and subsequently this identifier may be used when indicating the specific subdivision for the branch nodes.

The representation, encoding, and structuring of the metadata when generating data for the image signal may be achieved using any suitable approach and algorithm.

In many embodiments, the metadata describing the tree data structure may advantageously be generated as a data stream with an ordered sequence of node data blocks for some and typically all of the nodes of the tree data structure. For example, an order of parsing through the tree of the tree data structure may be predetermined and node data blocks may be provided sequentially in that order.

Each node data block may comprise data relevant to that node. For example, a node data block for a branch node may indicate the subdivision that is applied. A node data block for a leaf node may indicate whether it is a used or unused leaf node, and the node data block for a used lead node may further indicate the origin of the segment (e.g. if not the default image/position) such as by providing a number of the originating partial image/view source image and a position indication for the segment in the originating partial image.

For example, the data stream may start with a node data block for the root node corresponding to the entire image. This may indicate a subdivision and thus a number of child nodes. The root node data block may be followed by a node data block for the first child node. If this is a branch node, the node data block may indicate the subdivisions. The next node data block may then be for the first child node of this node. This may continue until a node data block is included for the first encountered leaf node. The order may then go to the next child node for the parent node of the first leaf node etc. Thus, in this example, node data blocks are arranged in an order where the parsing of the tree is performed substantially in a vertical direction with horizontal shifts occurring only when one vertical path has been completed. In other embodiments, the ordering may focus on the horizontal parsing. For example, node data blocks may be provided for all nodes at a given hierarchical level, followed by all node data blocks at the next hierarchical level, etc.

In some embodiments, the metadata generator 409 may be arranged to further include an indication of the order of the sequence of node data blocks in the metadata, e.g. as part of initial configuration data. This may allow a flexible and adaptable approach and may e.g. allow the image signal transmitter 200 to adapt the order depending on the specific characteristics of the tree data structure.

When using a structured sequence of node data blocks, the image signal receiver 300 may in some embodiments be arranged to insert segment property indications between node data blocks or to include them in the node data blocks. Such a segment property indication may provide an indication of a property associated with the segments of the nodes of the following node data blocks, e.g. until a new segment property indication is received. Thus, rather than define a specific property in each node data block, a common indication may be included which is applicable until a replacement/update indication is received. The segment property indication may be provided in a node data block, i.e. a data value in an node data block may be considered to be a segment property indication which is to be applied before or after the node data block (i.e. it may apply to the node of the current node data block or only apply to the following node(s)).

A given segment property indication will thus be applicable to subsequent node data blocks (as well as to the current node data block), and typically until another segment property indication is received.

The segment property indication may specifically be indicative of a view source image indication and/or a view source image position indication for the subsequent node data blocks. For example, a segment property indication may be included which indicates that the following node data blocks relate to segments that belong to, say, partial image number 3 and which are offset by a translation vector of, say, a given number of horizontal and vertical pixels.

Such an approach may provide a highly efficient data representation.

Thus, in some embodiments, the described system may pack partial views using a block tree structure. The approach may be highly suitable for parallel processing. It may also allow an efficient representation of the metadata and may provide blocks that are suitable for subsequent block based image encoding, such as e.g. HEVC.

A specific approach for encoding the tree data structure may be as follows:
1. Initialize by encoding segment property indication defining: View number=0, Translation=(0, 0)
2. For each node: Encode: Used leaf|Unused leaf Branch (ternary or 2 bits)
    a. When used leaf:
        i. Encode View number changed? (1 bit)
        ii. Encode Translation changed? (1 bit)
        iii. When view number changed: Encode view number (uint8 or uint16)
        iv. When translation changed: Encode translation (int16 pair)
    b. When branch:
        i. Encode the subdivision The translation (x, y) can be divided by the smallest node width and height.

Each node data block may comprise a node code which can be expressed as a 4-bit code:

```
enum NodeCode {
    bits             = 4,
    leaf             = 0b1100,
    view_bit         = 0b0001,
    translation_bit  = 0b0010,
    muted            = leaf - 1,
    max_subdiv       = muted
};
```

This may result in the following node codes:

| Code | Description |
| --- | --- |
| $0000_2$ (0) | Subdivision 0 |
| $0001_2$ (1) | Subdivision 1 |
| ... | ... |
| $1010_2$ (10) | Subdivision 10 |
| $1011_2$ (11) | Unused leaf |
| $1100_2$ (12) | Leaf w/o attributes |
| $1101_2$ (13) | Leaf with view attribute |
| $1110_2$ (14) | Leaf with translation attribute |
| $1111_2$ (15) | Leaf with both attributes |

The encoding of the metadata may specifically be by arithmetic coding, such as Context-adaptive Binary Arithmetic Coding (CABAC) coding.

It will be appreciated that the approach may be used with any suitable image encoder, or video encoder in examples where the images correspond to frames of a video sequence.

However, advantageous performance may be achieved by aligning the segments and nodes with a coding block tree of a video codec. This (multi-level) block-alignment may reduce the texture and depth bitrate. Also, the metadata bitrate may be reduced by deriving predictions for node subdivisions and/or origin data from the structure of the coding block tree (in situations where a client device has access to this information.)

The image signal receiver 300 may accordingly receive an image signal that comprises segmented combined partial images together with a tree data structure that defines the segmentation and how the segmented combined partial images are generated from original partial images. The image retriever 303 may then regenerate the original partial images by extracting the relevant segments from the received segmented combined partial image based on the metadata and positioning them as indicated in the partial images. The image retriever 303 may accordingly proceed to provide the original partial images to the first renderer 305 for rendering.

Thus, the image retriever 303 may traverse the tree data structure in a suitable order, copying each decoded block/segment to the indicated partial image. The size and position of each segment is known from the tree data structure and the position in the partial image is known due to the translation/position metadata.

In other embodiments, e.g. the second renderer 307 may directly parse the tree data structure and render each used leaf node/used segment directly from the combined partial image without first generating the partial views. This may often be more memory efficient.

Thus, the image signal receiver 300 may be arranged to extract image data for a set of view source images in response to the metadata. Each of the view source images may correspond to a given viewpoint of the scene and thus the extracted image data may be associated with a viewpoint. Thus, the renderer may extract image data for different viewpoints based on the metadata. The image data for the different viewpoints may e.g. be extracted as described above by considering the hierarchical tree structure.

The extracted image data for the set of view source images may thus be partial images and may correspond to the original partial images. In some embodiments, the partial images may be fully recreated. In other embodiments, only the specific required or desired image data may be extracted.

The first or second renderer 305, 307 may then synthesize images for a given viewpoint based on the extracted image data for different viewpoints. It will be appreciated that many algorithms are known for synthesizing an image for a given viewpoint based on image data from other viewpoints and that any suitable algorithm may be used. For example, as previously mentioned, an image may be synthesized based on one (e.g. master) view source image and image data from other view source images may be used to fill in occlusion holes in the generated image.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example shall not be construed as limiting the scope of the claims in any way.

The invention claimed is:

1. An apparatus for generating an image signal, the apparatus comprising:
   an image source circuit,
      wherein the image source circuit is arranged to provide a first image,
      wherein the first image is divided into a set of segments,
      wherein the set of segments comprises a first segment and a second segment,
      wherein the first segment has a first size,
      wherein the second segment has a second size,
      wherein the first size is different than the second size,
      wherein the first image comprises image data only in a subset of segments of the set of segments,
      wherein the image data of a segment of the subset of segments is image data from a segment of a view source image,
      wherein the view source is one of a set of view source images,
      wherein the set of view source images represents a scene from a viewpoint;
   a metadata generator circuit,
      wherein the metadata generator circuit is arranged to generate a metadata,
      wherein the metadata is indicative of the image data content of the first image,
      wherein the metadata is structured a data tree structure,
      wherein each node of the data tree structure is linked to at least one segment of the set of segments,
      wherein each node is a branch node or a leaf node,
      wherein a branch node is a parent node,
      wherein the parent node links to at least one child node,
      wherein each child node of the parent node is linked to a subsegment,
      wherein each subsegment is generated by a subdivision of the segment of the parent node,
      wherein a leaf node has no child nodes and is linked with at least one segment of the set of segments,
      wherein a leaf node is either an unused leaf node linked to a segment for which the first image comprises no image data or a used leaf node linked to a segment for which the first image comprises image data,
      wherein the metadata indicates whether each node is a branch node, a used leaf node, or an unused leaf node; and
   an image signal generator circuit,
      wherein the image signal generator circuit is arranged to generate an image signal,
      wherein the image signal comprises the image data of the first image and the metadata.

2. The apparatus of claim 1, wherein the metadata further comprises an indication of the view source image of at least one segment linked to used leaf nodes.

3. The apparatus of claim 1, wherein the metadata further comprises an indication of a position difference between a position in the first image of a first segment linked to a used leaf note and a position in the view source image of a corresponding segment of the view source image.

4. The apparatus of claim 1,
   wherein the image signal comprises at least some of the metadata as a data stream,
   wherein the metadata comprises an ordered sequence of node data blocks for at least a plurality of nodes of the data tree structure,
   wherein the set of properties comprises an indication of whether the node is a branch node or a leaf node.

5. The apparatus of claim 4,
   wherein the ordered sequence comprises a plurality of segment property indications,
   wherein each segment property indication is indicative of a property of at least one segment property applicable to subsequent node data blocks.

6. The apparatus of claim 4, wherein the image data comprises an indication of the ordered sequence.

7. The apparatus of claim 1,
   wherein a subdivision for a segment of a branch node is selected from one of a set of allowable subdivisions,
   wherein the metadata comprises data for a branch node,
   wherein the metadata indicates a subdivision out of the set of allowable subdivisions used for the branch node.

8. The apparatus of claim 7, wherein the metadata comprises an indication of the set of allowable subdivisions.

9. The apparatus of claim 1,
   wherein the set of view source images comprises a plurality of view source images,
   wherein the plurality of view source images represent the scene from different viewpoints.

10. The apparatus of claim 1, wherein a root node of the data tree structure is linked with a segment corresponding to the entire first image.

11. The apparatus of claim 1,
    wherein the metadata comprises an indication of a smallest segment size,
    wherein the segments of the set of segments have sizes,
    wherein the sizes are multiples of the smallest segment size.

12. The apparatus of claim 1, further comprising:
    a segmenter circuit,
       wherein the segmenter circuit is arranged to generate a segmented partial image for each of at least some of the view source images of the set of view source images,
       wherein the segmented partial image for a view source image comprises a plurality of segments, wherein the plurality of segments has an outline selected from a set of predetermined outlines,
wherein the segments are divided into used segments for which at least some pixels comprise image data from the view source image and unused segments for which no pixel comprises image data from the view source image; and
a combiner circuit, wherein the combiner circuit is arranged to generate the first image by generating at least some segments of the set of segments of different sizes by including used segments from the least some view source images and not including unused segments from the at least some view source images in the first image.

13. The apparatus of claim 12, wherein the segmenter circuit is arranged to generate a first segmented partial image for a first view source image by:
dividing the pixels of the first view source image into a first set of pixels and a second set of pixels,
wherein the first set of pixels comprises first pixel data,
wherein the second set of pixels comprises second pixel data,
wherein the first pixel data is included in the image data,
wherein the second pixel data is not included in the image data; and
tiling the first view source image into first view segments,
wherein each of the first view segments have outlines selected from the set of predetermined outlines,
wherein the tiling is such that unused segments are generated by fitting the predetermined outlines to regions of pixels belonging to the second set of pixels.

14. An apparatus for processing an image signal, the apparatus comprising:
a receiver circuit, wherein the receiver circuit is arranged to receiver an image signal, the image signal comprising:
image data of a first image,
wherein the first image is divided into a set of segments,
wherein the set of segments comprises a first segment and a second segment,
wherein the first segment has a first size,
wherein the second segment has a second size,
wherein the first size is different than the second size,
wherein the first image comprises image data only in a subset of segments of the set of segments,
wherein the image data of a segment of the subset of segments is image data from a segment of a view source image,
wherein the view source is one of a set of view source images representing a scene from a viewpoint;
metadata indicative of the image data of the first image,
wherein the image data is structured a data tree structure,
wherein each node of the data tree structure is linked to a segment of the first image,
wherein each node is a branch node or a leaf node,
wherein a branch node is a parent node,
wherein the parent node links to at least one child node,
wherein each child node of the parent node is linked to a subsegment,
wherein each subsegment is generated by a subdivision of the segment of the parent node,
wherein a leaf node has no child nodes and is linked with a segment of the set of segments,
wherein a leaf node is either an unused leaf node linked to a segment for which the first image comprises no image data or a used leaf node linked to a segment for which the first image comprises image data,
wherein the metadata indicates whether the node is a branch node, a used leaf node, or an unused leaf node; and
a renderer circuit, wherein the renderer circuit is arranged to render synthesized view images from the image signal.

15. A method of generating an image signal, the method comprising:
providing a first image,
wherein the first image is divided into a set of segments,
wherein the set of segments comprises a first segment and a second segment,
wherein the first segment has a first size,
wherein the second segment has a second size,
wherein the first size is different than the second size,
wherein the first image comprises image data only in a subset of segments of the set of segments,
wherein the image data of a segment of the subset of segments is image data from a segment of a view source image,
wherein the view source is one of a set of view source images representing a scene from a viewpoint;
generating metadata,
wherein the metadata is indicative of the image data content of the first image,
wherein the metadata is structured a data tree structure,
wherein each node of the data tree structure is linked to at least one segment of the set of segments,
wherein each node is a branch node or a leaf node,
wherein a branch node is a parent node,
wherein the parent node links to at least one child node,
wherein each child node of the parent node is linked to a subsegment,
wherein each subsegment is generated by a subdivision of the segment of the parent node,
wherein a leaf node has no child nodes and is linked with a segment of the set of segments,
wherein a leaf node is either an unused leaf node linked to a segment for which the first image comprises no image data or a used leaf node linked to a segment for which the first image comprises image data,
wherein the metadata indicates whether each node is a branch node, a used leaf node, or an unused leaf node; and
generating an image signal, wherein the image signal comprises the image data of the first image and the metadata.

16. A computer program stored on a non-transitory medium, wherein the computer program when executed on a processor performs the method as claimed in claim 15.

17. The method of claim 15, wherein the metadata further comprises an indication of the view source image of at least one segment linked to used leaf nodes.

* * * * *